March 14, 1961    P. R. LAGUILHARRE    2,975,069
METHOD FOR PASTEURIZING OR STERILIZING
LIQUID AND SEMI-LIQUID PRODUCTS
Filed June 15, 1956    4 Sheets-Sheet 3

INVENTOR
PIERRE ROBERT LAGUILHARRE
BY Linton and Linton
ATTORNEYS

March 14, 1961 P. R. LAGUILHARRE 2,975,069
METHOD FOR PASTEURIZING OR STERILIZING
LIQUID AND SEMI-LIQUID PRODUCTS
Filed June 15, 1956 4 Sheets-Sheet 4

INVENTOR
PIERRE ROBERT LAGUILHARRE
BY Linton and Linton
ATTORNEYS

United States Patent Office 2,975,069
Patented Mar. 14, 1961

2,975,069

METHOD FOR PASTEURIZING OR STERILIZING LIQUID AND SEMI-LIQUID PRODUCTS

Pierre Robert Laguilharre, 6 Rue Robin,
Enghien-les-Bains, France

Filed June 15, 1956, Ser. No. 591,721

Claims priority, application France Sept. 20, 1955

23 Claims. (Cl. 99—216)

My invention has for its object an improved method for pasteurizing or sterilizing or heat treating in a continous manner foodstuffs and the like products presented in a liquid form state that is a liquid or semi-liquid state such as dairy products, e.g. milk or cream, fruit-juices, certain preserves and the like.

It has already been proposed to heat treat to pasteurize or sterilize products of the type considered by injecting steam into the product atomized preferably into a state of fine subdivision, after which the hot product thus treated by a pasteurizing or sterilizing injection of steam is subjected to at least one expansion so as to be brought down to a pressure intermediate between the pressure corresponding to the initial temperature of the material to be pasteurized or sterilized and that corresponding to the temperature of pasteurization or sterilization, while the vapour evolved during this expansion serves for preheating to a certain extent the product to be pasteurized or sterilized before it is subjected to the pasteurizing procedure. The extent of such preheating depends on the temperature of the product after expansion. Some live steam is needed to complete the necessary preheating.

It has been proposed in particular to introduce the vapour evolved during the above defined expansion of the pasteurized or sterilized product just as evolved during expansion and at the expansion pressure, within the mass of the material to be treated when atomized to a suitable state of subdivision, so as to ensure the preheating of said product through admixture with the latter.

It is apparent that this manner of operating allows reducing the amount of extraneous or live saturated steam which it is necessary to introduce into the material with a view to ensuring its pasteurization or its sterilization, this amount being all the smaller when the preheating has been executed up to a temperature nearer the temperature of pasteurization or sterilization. This result is of particular importance in the case of the pasteurization or sterilization of milk where it is essential to obtain a final product having an unaltered composition. From this standpoint, the reintroduction into the milk, with a view to its preheating, of the vapour removed from the milk during the expansion to which it is subjected after pasteurization or sterilization, is of considerable advantage since it has for its result to reincorporate into the milk inter alia the flavouring substances which would otherwise be absent from the final product, which absence has generally a detrimental effect on the taste of the latter.

Starting from these facts, I have conceived, in accordance with my invention, no longer to use, for the preheating of the product to be treated, the vapour at the same pressure and just as it is evolved during the expansion to which said product is subjected after pasteurization or sterilization, but to compress mechanically said vapour to a pressure which is sufficiently above that which corresponds to the temperature of pasteurization or sterilization so that said vapour may be injected at said temperature into the mass of the liquid material to be treated which preferably has been atomized to a state of fine subdivision with a view to providing for its pasteurization or sterilization. The pasteurization or sterilization of the material to be treated through the vapour evolved out of the actual product which has been pasteurized or sterilized allows consequently cutting out completely the introduction of extraneous or live vapours or steam into the material, and obtaining a final composition of the product which is practically identical with its original composition, which result is of substantial advantage chiefly in the case of milk.

In the embodiment of my improved method, the vapour evolved during the expansion of the pasteurized or sterilized product may be collected and compressed to the desired pressure in a single stage by means of a single compressor before it is introduced into the pasteurizing or sterilizing chamber through the agency of a valve providing for the expansion of the vapour down to a pressure the value of which corresponds to the temperature of pasteurization of sterilization.

According to a modification, the expansion of the hot product into which the pasteurizing or sterilizing vapour has been injected may be performed in several successive stages under decreasing pressures ranging between the pressure corresponding to pasteurization or sterilization temperature and the pressure corresponding to the initial temperature of the material to be pasteurized or sterilized, and the vapour evolved during these successive expansions may be subjected to compression also in a plurality of stages at increasing pressures ranging between the pressure at which the last expansion is performed and a pressure higher than that corresponding to the temperature of pasteurization or sterilization.

This modus operandi which requires the use of several compressors or of a multi-stage compressor, allows in contradistinction to single stage compression obtaining a substantial economy in the driving power required for reaching the desired final pressure for the vapour, which is to provide for pasteurization or sterilization, the total power to be expanded for compression of the vapour produced during the different expansion stages up to the pressure prevailing in the immediately higher stages being substantially lower than the power required for compressing in a single stage the vapour evolved through a single complete expansion stage as in the preceding case, up to the comparatively high pressure at which the injection of the pasteurizing or sterilizing vapour is to be performed.

A further embodiment of the method according to the present invention, which may be employed both in the case where the expansion of the pasteurized or sterilized product and the further compression of the vapours obtained through this expansion are performed in a single stage, and in the case where such an expansion and a compression are performed in a plurality of successive stages, consists in causing the untreated material to be pasteurized or sterilized to enter the same compressor or compressors which serve for the compression of the vapours from the expansion chamber, the outlet of the last stage of the compressor opening into a suitably sized channel or large pipe forming a pasteurizing or sterilizing chamber where the untreated material and the vapors come into intimate contact, and at the output of which the pasteurized or sterilized product expands in chambers in one or more stages down to the desired pressure.

Under such conditions, the untreated material is admixed intimately with the expansion vapours inside the same compressor or compressors; the expansion vapours compressed with the untreated material to be treated are condensed inside said compressor or compressors under the action of increasing compression operating gradually either inside the compressor or inside the different stages thereof. Thus, the volume of the vapours which are carried along becomes gradually smaller, which leads to a substantial economy in power. On the other hand, the pasteurizing and sterilizing is executed or brought to an end inside the channel or pipe forming an extension of the output end of the compressor in the last stage, which allows cutting out the use of a special pasteurizing or sterilizing chamber and of auxiliaries for ensuring a fine subdivision of the product to be pasteurized or sterilized.

According to a modification of this last embodiment as defined in the preceding paragraph, it is possible to subject the pasteurized or sterilized product to a single expansion and to make the untreated material to be pasteurized or sterilized and the vapour produced by said expansion flow together in succession through a plurality of successive compression stages, the outlet of the last stage opening as precedingly into a channel forming a pasteurizing or sterilizing chamber and at the output end of which the pasteurized or sterilized product is subjected to the above referred to expansion.

In all cases, the untreated material to be pasteurized or sterilized may be subjected before its pasteurization or sterilization to a preliminary heating produced for instance by means of a surface heat exchanger provided either with a steam circulating circuit or with a circuit for the countercurrent circulation of the product which has been subjected to the expansion following the pasteurization or the sterilization, in which case this preheating ensures simultaneously a cooling of the treated product. It is also possible to cut out any preheating of the material to be treated and to bring the latter from its starting temperature up to its pasteurizing or sterilizing temperature through injection into the untreated material of the vapour produced by the subsequent expansion of said product compressed to a suitable pressure.

In all cases, also, it is possible to start the pasteurizing or sterilizing procedure by initially introducing for the purpose of priming at a predetermined point of the channel feeding the vapour from the expansion chamber to the pasteurizing or sterilizing chamber, a suitable priming amount of saturated live outside steam so as to bring a first fraction of the product to its pasteurizing or sterilizing temperature, this initial admixture of steam being cut off after the regular steady state operation has started and the pasteurizing temperature may be reached through mere injection of the vapour produced through the expansion following the pasteurizing or sterilizing stage.

Other embodiments of the method provided by my invention will be described hereinafter with reference to the accompanying drawings, in which Figs. 1 to 8 are diagrams of different pasteurizing or sterilizing plants selected as non-restrictive examples of application of the present invention.

Figure 1:
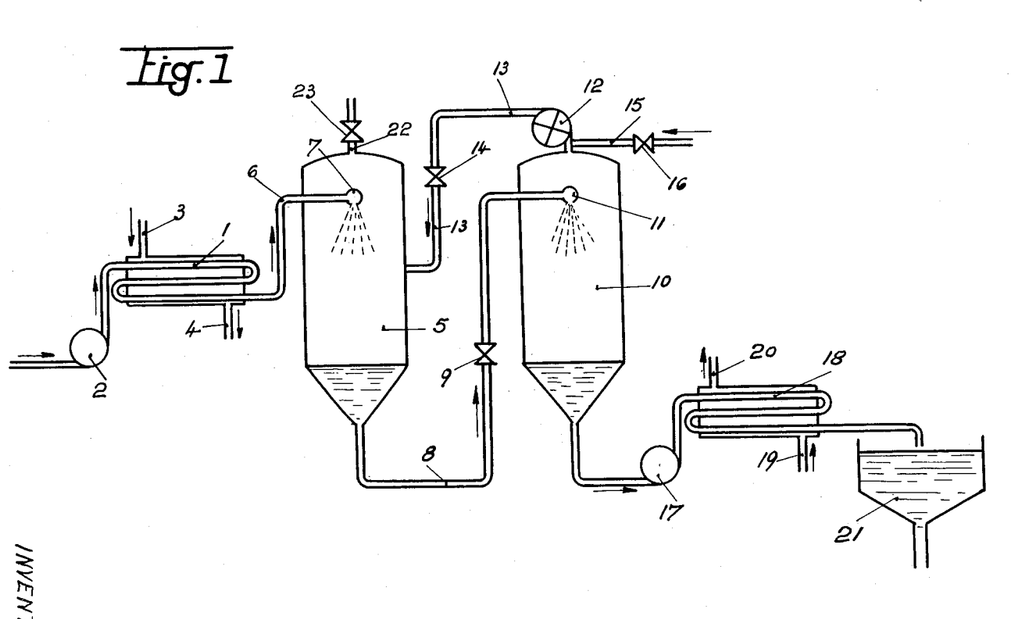
Fig. 1 shows a first embodiment of my invention employing one pre-heater, a treating chamber for pasteurization or sterilization, one expansion chamber, and a cooling exchanger, with connections including compressors to feed back vapors from the expansion chamber to the treating chamber.

Turning to Fig. 1, 1 designates a tubular heat exchanger inside which milk or the like untreated material to be pasteurized or sterilized is caused to flow from a supply tank under the action of a pump 2, so as to be subjected to a preliminary heating to a temperature which is still below pasteurizing or sterilizing temperature by the live steam introduced at 3, into one compartment of the heat exchanger while the condensate steam is tapped off at 4. The untreated material thus preheated is fed into the pasteurizing or sterilizing chamber 5 through a channel 6 provided at its end opening into the chamber 5 with an atomizing nozzle 7 of any suitable type; the lower section of the pasteurizing or sterilizing chamber 5 is connected with a channel 8 provided with a pressure-reducing valve 9 and opening into an expansion chamber 10, the channel 8 discharging inside the latter through an atomizing nozzle 11.

According to the present invention, the upper section of the expansion chamber 10 is connected with the suction end of a mechanical compressor 12, preferably of the type including a separate oil chamber and the delivery end of which compressor 12 is connected through a pipe 13 provided with a pressure-reducing valve 14 with the pasteurizing or sterilizing chamber 5. At a suitable point of the pipe 13 connecting the expansion chamber 10 with the pasteurizing or sterilizing chamber 5, for instance between the expansion chamber 10 and the compressor 12, there opens a lateral pipe 15 provided with a valve 16 and adapted to feed initially priming live steam into the pipe 13 to start operation to raise the temperature in pasteurizing chamber 5 to the desired pasteurizing temperature.

To the lower end of the expansion chamber 10 is connected the suction end of an extraction pump 17 the delivery end of which is connected with a tubular heat exchanger 18 acting as a cooler receiving at 19 cooling water which flows out at 20 at a higher temperature. The cooled product passing out of heat exchanger 18 may be collected in a receiver vat 21.

The pasteurizing or sterilizing chamber 5 is provided at its upper end in a conventional manner with a gas-releasing or relief opening 22 adapted to be closed by a pressure retaining valve 23 to allow the escape only of the small amount of air which may be carried along by the milk particles.

The general operation of the arrangement thus disclosed is as follows:

Assuming for instance it is desired to proceed with the sterilization of milk, the milk to be treated is introduced into the preliminary heater 1 through the pump 2 at a temperature which is at the start equal to about 15° C. and it is raised to a temperature of about 100° C. for instance. The milk thus heated is fed by the channel 6 into the sterilizing chamber 5 inside which it is finely subdivided by the atomizing nozzle 7. The milk is then raised rapidly to its sterilization temperature of about say 140° C. by the vapors and steam entering the chamber 5 through the pipe 13.

At the beginning of the operation, said steam is fed through the line for the admission of outside live steam 15, the valve 16 provided on said steam admission line being closed as soon as the plant begins operating normally in a steady state with its own by-product vapors as disclosed more completely hereinafter. The small amount of milk treated during this initial priming period and incorporating a certain amount of steam from an outer supply may be removed if desired at the delivery outlet of the plant.

The milk sterilized in the chamber 5 collects at the lower end of the latter and it is fed through the pipe 8 into the expansion chamber 10. The expansion to which the milk is subjected inside the latter is such that its temperature is lowered to say about 100° C.; the steam and vapors evolved during the expansion is fed to the compressor 12 and compressed by the latter to a suitable pressure of the magnitude of say 3 kg. above atmospheric pressure so that the vapour and steam is thus brought to a temperature higher than the temperature of sterilization. It is then introduced into the sterilization chamber 5 through the pipe 13 and the valve 14 which provides for its expansion whereby its pressure drops down to a value corresponding to the sterilization temperature, say a pressure of a magnitude of about 2.7 kg. above atmospheric pressure for a sterilizing temperature of about 140° C.

It is thus apparent that after a short starting period referred to hereinabove, the sterilization of the milk is performed entirely by raising the temperature through the agency of the vapours evolved out of the actual milk which has been treated, which cuts out any introduction of extraneous live steam from an outside source into the milk under treatment and ensures on the other hand the reintroduction into the latter of the volatile flavouring matter evolved during the expansion to which the milk is subjected inside the chamber 10. The final composition of the milk undergoing treatment remains thus the same as its original composition, the valve 23 inserted in the gas-releasing port 22 of the sterilizing chamber 5 being adjusted so as to allow the escape only of the small amount of air which may be carried along by the milk particles.

The sterilized milk is removed from the lower section of the expansion chamber 10 through the pump 17 and it is fed by the latter into the tubular heat exchanger 18 inside which it is subjected to a further cooling at a temperature of about 30° C. for instance before it is collected in the storing vat 21.

Obviously, the arrangement illustrated in Fig. 1 is applicable under other conditions otherwise similar to those which have just been described, except for the treating temperatures to be applied to the pasteurizing of milk and generally speaking to the pasteurizing or sterilizing of any liquid or semi-liquid foodstuff.

Figure 2:
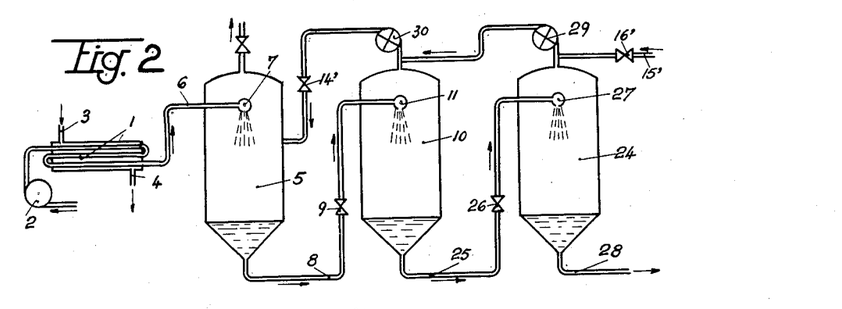
Fig. 2 shows an embodiment with two expansion chambers connected in series, and the vapors from both expansion chambers being fed back together to the treating chamber.

Turning now to the embodiment illustrated in Fig. 2 wherein the same reference numbers designate the same parts as in the case of Fig. 1, the product to be pasteurized or sterilized such as milk is subjected to a preliminary heating in the heat exchanger 1 and is then fed and atomized inside the pasteurizing or sterilizing chamber 5. The lower section of the latter is connected through the pipe 8 provided with a pressure-reducing valve 9 with the first expansion chamber 10, this pipe 8 carrying at its end opening inside this chamber an atomizing nozzle 11. The lower section of this expansion chamber 10 is connected with a further expansion chamber 24 through a pipe 25 provided with a pressure-reducing valve 26, said pipe delivering into the chamber 24 through an atomizing nozzle 27.

In the arrangement of Fig. 2, assuming as precedingly that it is desired to proceed with the sterilization of milk, said milk is introduced into the preliminary heat exchanger 1 at an initial temperature of about 15° C. and is raised in said heat exchanger to a temperature of say 100° C. and its sterilization is performed inside the chamber 5 at a temperature of about 140° C. for instance. The milk which has been sterilized inside said chamber is subjected in the first expansion chamber 10 to an expansion which lowers its temperature for instance down to about 125° C. and then inside the chamber 24 to a second expansion which lowers its temperature down to about 100° C. The sterilized milk delivered at 28 in the lower section of the chamber 24 may be subjected to a further cooling in the manner disclosed for instance with reference to the heat exchanger arrangement illustrated in Fig. 1.

With further reference to Fig. 2, in accordance with my invention, the vapour evolved inside the further expansion chamber 24 is fed into a compressor 29 which compresses it to a pressure substantially equal to the pressure of the vapour evolved in the first expansion chamber 10, i.e. in the example selected to a pressure corresponding to the temperature of 125° C., i.e. a pressure of about 1.5 kg. above atmospheric pressure. The mixture of the vapours passing out of the compressor 29 and of the first expansion chamber 10 is fed integrally together into a second compressor 30 which compresses it to a pressure of a magnitude of about say 3 kg. above atmospheric pressure, which corresponds to a temperature above sterilization temperature. The vapour thus compressed is then introduced into the sterilizing chamber 5 through a pressure-reducing valve 14' which causes it to expand so that its pressure drops down to a value corresponding to sterilization temperature, i.e. in the example considered to a pressure of about 2.7 kg. above atmospheric pressure, which corresponds to a sterilizing temperature of about 140° C.

A lateral pipe 15' feeding outside live steam into the arrangement and provided with a valve 16' is connected in the case of Fig. 2 with a point lying between the compressor 29 and the expansion chamber 24 so as to initially supply live priming steam to provide for the starting of the operation as disclosed hereinabove with reference to Fig. 1.

Figure 3:
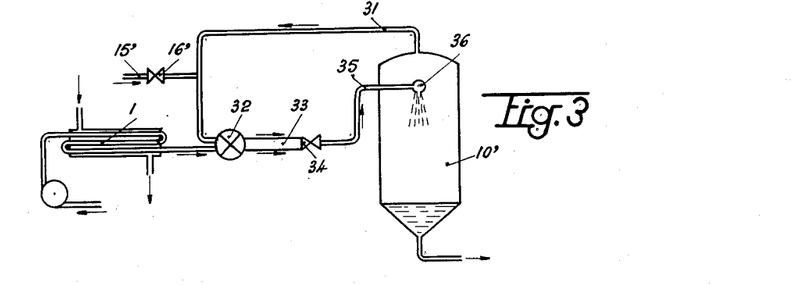
Fig. 3 shows an embodiment in which a large pipe constitutes the treating chamber and there is one expansion chamber whose vapors are fed back to the treating chamber.

The diagram illustrated in Fig. 3 is that of a pasteurizing or sterilizing plant including a single expansion and a single compression stage and wherein the untreated material to be pasteurized or sterilized is fed into the compressor together with the vapour produced by the expansion. As is apparent from inspection of 3, the vapour evolved in the single expansion chamber 10' is recycled through the pipe 31 into the compressor 32 which is also fed with the untreated material which has been previously subjected to a preliminary heating inside the heat exchanger 1 so as to deliver the mixture thereby obtained into a channel 33 forming the pasteurizing or sterilizing chamber.

Assuming, as in the preceding examples, that it is desired to sterilize milk at a temperature of 140° C., and that the vapour passing out of the expansion chamber 10' and the unheated material passing out of the heat exchanger 1 are both at a temperature of about 100° C., the compression ratio obtained by the compressor 32 should be such that the mixture delivered through the sterilizing channel 33 is raised to a temperature of about 140° C. By reason of the intimate mixture between the unheated milk and the vapour from the expansion chamber as produced by the stirring to which the latter are subjected inside the compressor, the sterilization of the milk may be ensured inside the sterilizing pipe 33 within a very short period; the size of the channel 33 should obviously be calculated in a manner such that this result may be achieved without any risk of detrimentally affecting the grade of the milk. A pressure-reducing valve 34 fitted at the output end of the channel 33 opens into a pipe 35 opening in its turn inside the expansion chamber 10' through an atomizing nozzle 36 through which the sterilized milk expands inside said chamber in a manner such that its temperature is lowered down to the above mentioned temperature of about 100° C. As precedingly the starting of the plant can be obtained by means of an input pipe 15' feeding a priming amount of live steam, said input pipe being connected in the present case with a point of the pipe 31 connecting the expansion chamber 10' with the compressor 32.

Figure 4:
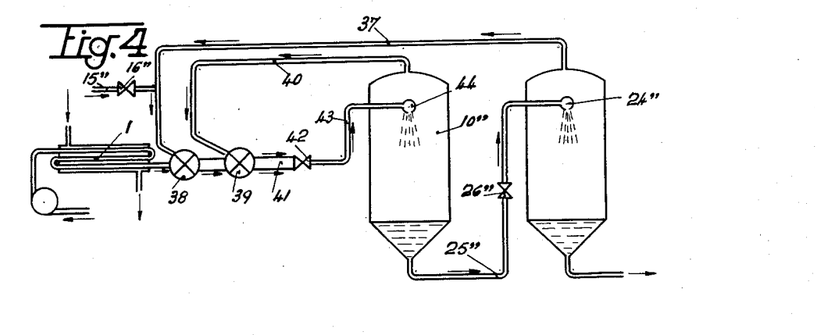
Fig. 4 shows an embodiment in which a large pipe constitutes the treating chamber as in Fig. 3, and there are two expansion chambers connected in series whose output vapors are separately fed back to two compressors preceding the treating chambers.

Fig. 4 illustrates the application of the arrangement disclosed with reference to Fig. 3 to the case of a plant including a plurality of expansion and compression stages. In the example illustrated in Fig. 4, the plant includes a first expansion chamber 10" the lower section of which is connected as in the case of Fig. 2 with the second expansion chamber 24" through the pipe 25' and the valve 26". The vapour evolved inside the chamber 24" is fed through a pipe 37 to a compressor 38 which is also fed with the preheated untreated material delivered out of the heat-exchanger 1 and compresses the associated fluids thus obtained to a pressure which is substantially equal to that of the vapour evolved in the first expansion chamber 10". The fluids thus compressed by the compressor 38 are further admixed beyond said compressor 38 with the vapour evolved inside the chamber 10" which is fed thereto by the pipe 40 and the mixture is now fed into the further compressor 39 which delivers the associated fluids into the treating pipe or channel 41 at a pressure corresponding to the temperature of pasteurization or sterilization. The pasteurized or sterilized product passing out of the channel 41 expands then inside the expansion chamber 10" through the pressure-reducing valve 42 which provides for such an expansion and which opens into the channel 43 opening in its turn inside said chamber 10" through the atomizing nozzle 44. The input of the initial outside priming steam is shown at 15" as opening into the pipe 37 between the expansion chamber 24" and the compressor 38.

Figure 5:
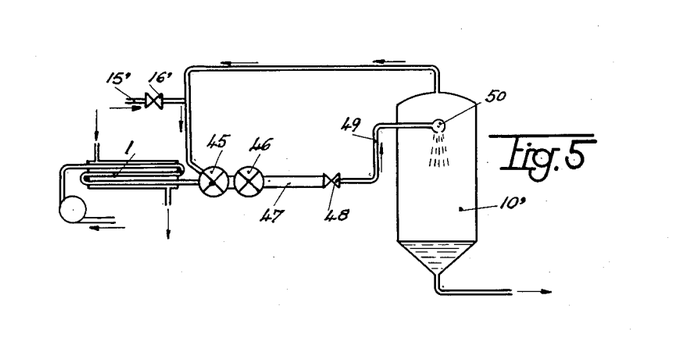
Fig. 5 shows an embodiment similar to Fig. 3 in which the treating chamber is a large pipe and there is one expansion chamber, but there is a two-stage compressor preceding the treating chamber to which the vapors from the expansion chamber are fed back.

In the further modification illustrated in Fig. 5, there is provided a single expansion chamber 10' but the vapour evolved in said chamber is subjected to a compression in at least two stages through the two compressors 45 and 46 inserted in series and through which the untreated material subjected to a preliminary heating in the heat exchanger 1 flows in succession. The compression to which the mixture of vapour and untreated material is subjected inside the first compressor 45 is such that, at the output of the latter, said mixture is at a temperature lying between the preliminary heating temperature and the temperature of pasteurization or sterilization, while the compression to which said mixture is subjected in the second compressor 46 is such that the temperature of said mixture at the output of said second compressor is equal to the pasteurization or sterilization temperature. This pasteurization or sterilization is performed as precedingly in a suitably sized pipe or channel as shown at 47, said channel 47 being connected at the output end of the compressor 46 and leading to the pressure-reducing valve 48 connected in its turn with the expansion chamber 10' through a pipe 49 carrying an atomizing nozzle 50 at its end opening in the expansion chamber 10'.

Obviously the compressors inserted in series may be replaced by a multi-stage compressor.

On the other hand, in the different embodiments which have been illustrated and described, it is possible, instead of producing the preliminary heating of the material to be pasteurized or sterilized in a heat exchanger through outside live steam, to provide for this preheating as already mentioned through the cooling of the pasteurized or sterilized product by means of a counter-current circulation inside a single surface exchanger of the product to be treated on the one hand and of the final pasteurized or sterilized product fed out of the last expansion chamber on the other hand.

Figure 6:
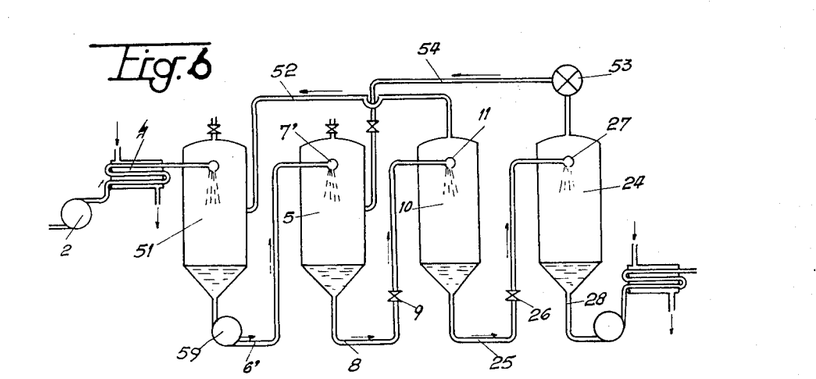
Fig. 6 shows an embodiment having a treating chamber, two expansion chambers in series, an initial tubular heat exchanger pre-heater, an auxiliary preheating vaporizing chamber, and separate feed back connections respectively from the two expansion chambers to the treating chamber and the auxiliary preheating chamber.

Fig. 6 shows another modification wherein the same reference numbers designate the same parts as in the case of Fig. 2. Thus, 5 is the pasteurizing or sterilizing chamber the lower section of which is connected through the pipe 8 provided with a pressure-reducing valve 9 with a first expansion chamber 10, said pipe 8 carrying at its end opening inside said chamber 10 an atomizing nozzle 11. The lower section of the expansion chamber 10 is connected with a further expansion chamber 24 through a pipe 25 provided with a pressure-reducing valve 26, this pipe opening into the chamber 24 through an atomizing nozzle 27. In said modification, of Fig. 6, the material product to be pasteurized or sterilized (for instance milk), preheated if desired in a tubular heat exchanger 1 inside which it is caused to flow by a pump 2, is fed and sprayed into an auxiliary preheating chamber 51 located before the pasteurizing or sterilizing chamber 5, the lower section of said preheating chamber 51 being connected with the latter through a pipe 6' opening into the chamber 5 through an atomizing nozzle 7', and said preheating chamber receiving the steam evolved inside the first expansion chamber 10 directly through a channel 52 connected with the upper end of the latter. On the other hand, the steam evolved inside the further expansion chamber 24 is fed into a compressor 53 which compresses it to a pressure higher than that which corresponds to the temperature of pasteurization or sterilization, the steam thus compressed being fed into the pasteurization or sterilization chamber 5 through a pipe 54.

Assuming for instance it is desired to proceed with the sterilization of milk at a temperature of 140° C., the hot sterilized milk coming out of the sterilization chamber 5 undergoes inside the chamber 10 a first expansion which lowers its temperature for instance down to 120° C., then it undergoes inside the chamber 24 a further expansion which lowers its temperature for instance down to 100° C., after which the sterilized milk delivered at 28 in the lower section of the chamber 24 may be subjected to a further cooling in a heat exchanger in the manner disclosed for instance with reference to the arrangement illustrated in Fig. 1. In Fig. 6, the milk to be treated, introduced into the preliminary heat exchanger 1 at an initial temperature of about 15° C. for instance, is raised in said exchanger to a temperature of about 100° C., for instance, then, passing into the auxiliary preheating chamber 51, is raised in this chamber to a temperature of about 120° C. through admixture with the steam coming out of the expansion chamber 10 through pipe 52. The milk so heated to 120° C. is fed through a pump 59 into the sterilization chamber 5 wherein its temperature is raised to 140° C. through the steam coming out of the expansion chamber 24 through pipe 54, said steam being suitably compressed through the compressor 53. As will be understood, owing to the preheating of the milk to the temperature of 120° C., in preheating chamber 51, the volume of the steam exhausted through the compressor 53 (and accordingly the power consumed by the latter) to raise the milk to the sterilization temperature of 140° C., is substantially reduced to half of the volume which would have been necessary, in the absence of the chamber 51, to raise the milk directly from 100° C. to 140° C.

Figure 7:
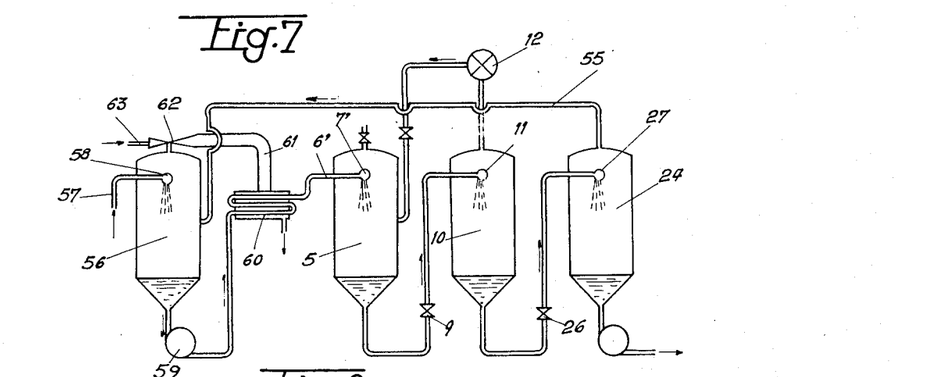
Fig. 7 shows an embodiment having a treating chamber, two expansion chambers in series, an initial vaporizing preheating chamber followed by a tubular heat exchanger preheater, and separate feedback connections for vapors from the two expansion chambers respectively to the initial preheating chamber and the treating chamber.

In the modification illustrated in Fig. 7, 5 is the pasteurization or sterilization chamber which is followed, as previously, by two expansion chambers 10 and 24. The steam and vapor evolved inside the first expansion chamber 10 is fed into a compressor 12 which compresses it to a pressure higher than that which corresponds to the pasteurization or sterilization temperature and which discharges it into the pasteurization or sterilization chamber 5. The steam and vapor evolved inside the second expansion chamber 24 is fed directly through a channel 55 into a preheating chamber 56 which receives the cold material to be treated through a pipe 57 carrying at its end opening inside said chamber an atomizing nozzle 58. The product collected in the lower section of the chamber 56 is exhausted from the latter by a pump 59 and fed into a tubular surface exchanger 60 which receives at 61 the steam coming out of a steam ejector 62 receiving outside live steam at 63 and which is also connected to the upper end of the chamber 56 so as to exhaust the uncondensable air and gaseous products from the latter. The material which has been thus subjected to a further preheating in the surface exchanger 60, is fed into the pasteurization or sterilization chamber 5 through a pipe 6' opening into the chamber 5 through an atomizing nozzle 7', and it is pasteurized or sterilized inside said chamber by the steam and vapors compressed through the compressor 12.

Assuming that the modification of Fig. 7 is used for instance for carrying out the pasteurization of milk at a temperature of 100° C., the hot pasteurized milk coming out of the pasteurization chamber 5 at this temperature undergoes inside the chamber 10 a first expansion which lowers its temperature for instance down to 80° C., then it undergoes inside the chamber 24 a further expansion which lowers its temperature for instance down to 45° C., after which the pasteurized milk delivered in the lower section of the chamber 24 may be subjected to a further cooling through cooling apparatuses (not shown) fed with cool water and frozen water. The milk to be pasteurized, introduced into the preheating chamber 56 at an initial temperature of about 10° C. for instance, is raised in this chamber to a temperature of about 45° C. for instance through admixture with the steam coming out of the expansion chamber 24, then, being caused to circulate into the tubular surface exchanger 60, the milk undergoes in the latter a further preheating to a temperature of 80° C. for instance through the steam coming out of the steam ejector 62. The milk thus heated to 80° C. is then introduced into the pasteurization chamber 5 wherein its temperature is raised to 100° C. through the steam coming out of the expansion chamber 10, said steam being suitably compressed through the compressor 12.

In this embodiment of Fig. 7, the live steam consumption for preheating the milk in regular steady state operation is therefore limited to the calories which are necessary to heat the milk in tubular exchanger 60, from 45° C. to 80° C. Said temperatures are given for an initial temperature of the milk of 10° C. and a pasteurization temperature of 100° C. Obviously, if the temperature of the milk coming out of the tubular surface exchanger 60 is raised, all the other temperatures will be raised correspondingly.

Figure 8:
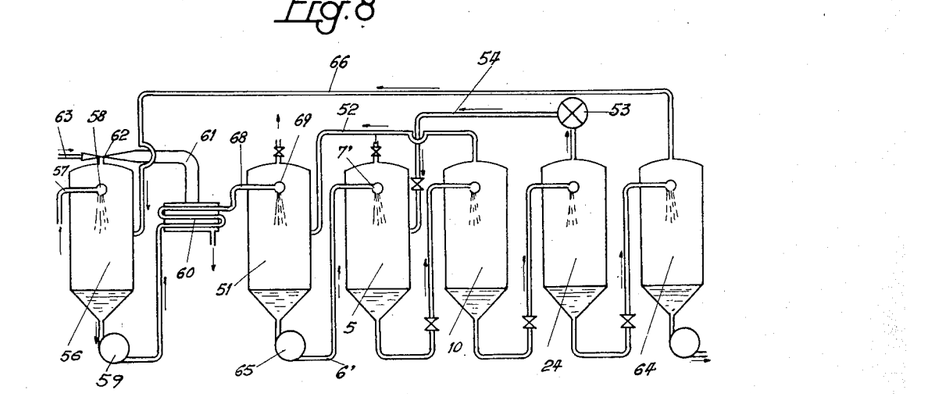
Fig. 8 shows as a combination of Fig. 6 and Fig. 7, an embodiment with a treating chamber and three expansion chambers and two preheating vaporizing chambers separated by a tubular heat exchanger preheater, and separate feedback connections for vapors from the three expansion chambers respectively to the two preheating vaporizing chambers and the treating chamber.

Fig. 8 illustrates another modification which comprises a combination of the embodiments shown in Figs. 6 and 7. In said modification of Fig. 8, the pasteurizing or sterilizing chamber 5 is followed by three expansion chambers 10, 24 and 64. The steam and vapors evolved in the first expansion chamber 10 is fed directly through a channel 52 into a final preheating chamber 51 located immediately before the pasteurization or sterilization chamber 5 and from which the preheated material to be treated is exhausted through a pump 65 and introduced into the treating chamber 5 through a pipe 6' opening into the chamber 5 through an atomizing nozzle 7'. The steam and vapors evolved in the second expansion chamber 24 is fed into a compressor 53 which compresses it to a pressure higher than that which corresponds to the pasteurization or sterilization temperature and which discharges it through a pipe 54 into the pasteurization or sterilization chamber 5. The steam and vapors evolved in the last expansion chamber 64 is fed through a channel 66 into a first preheating chamber 56 which receives the cold materials to be treated through a pipe 57 opening inside said chamber 56 through an atomizing nozzle 58. In this embodiment of Fig. 8, the materials preheated inside the chamber 56 is caused, as in the embodiment shown in Fig. 7, to circulate into a tubular surface exchanger 60 which receives at 61 the steam coming out of a steam ejector 62 connected to the upper end of the chamber 56. The product which has been subjected to a second preheating in the surface exchanger 60 is fed through a pipe 67 provided with an atomizing nozzle 68 into the final preheating chamber 51 wherein it undergoes a further preheating before being admitted into the pasteurization or sterilization chamber 5.

Assuming, as in the preceding example, that the modification of Fig. 8 is used for carrying out the pasteurization of milk at a temperature of 100° C., the hot pasteurized milk coming out of the chamber 5 at this temperature undergoes inside the chamber 10 a first expansion which lowers its temperature for instance down to 90° C., then in the chamber 24 a second expansion which lowers its temperature for instance down to 80° C., and finally in the chamber 64 a last expansion which lowers its temperature for instance down to 45° C. The pasteurized milk delivered from the chamber 64 may be subjected as previously to a further cooling through cooling apparatus fed with cool water and frozen water.

At the entrance of the plant, the milk to be treated, introduced into the first preheating chamber 56 at an initial temperature of about 10° C. for instance, is raised in said chamber to a temperature of about 45° C. through admixture with the steam and vapors directly coming out of the expansion chamber 64, then it is exhausted through the pump 59 and discharged into the tubular surface exchanger 60 wherein it is raised to a temperature of about 80° C., and finally the milk is fed into the final preheating chamber 51 wherein its temperature is raised to about 90° C. through admixture with the steam and vapors directly coming out of the expansion chamber 10. The milk thus heated to 90° C. is introduced into the pasteurization chamber 5 wherein its temperature is raised to 100° C. through the steam coming out of the intermediate expansion chamber 24, said steam being suitably compressed by the compressor 53. This embodiment unites therefore the advantages of the modifications shown in Figs. 6 and 7. Owing to the preheating of the milk to the temperature of 90° C. in the three preheaters, the volume of the steam exhausted through the compressor 53 (and accordingly the power consumed by the latter) to raise the milk to the pasteurization temperature of 100° C., is reduced to half of the volume which was necessary in the embodiment of Fig. 7 to raise the milk coming out of the tubular surface exchanger 60 directly from 80° C. to 100° C. Furthermore, the live steam consumption for preheating the milk in tubular exchanger 60 is the same as in the embodiment of Fig. 7, that is to say the consumption which corresponds to the calories necessary to raise the milk from 45° C. to 80° C. in the selected example.

It will be apparent to those skilled in the art that my invention is susceptible of adaptations and modifications to adapt the same to particular conditions, and all such modifications which are within the scope of the appended claims, I consider to be comprehended within the spirit of my invention.

What I claim is:

1. A continuous method for heat treating liquiform materials, which comprises introducing the liquiform material to be heat treated into a closed heat treating zone in a finely divided state, initially injecting priming live steam in said treating zone to heat the material to a desired treating temperature and then cutting off said steam when steady state operation is reached, introducing the so-treated product in liquid state to a closed expansion zone also in finely divided state, and therein cooling the product by expansion to a temperature intermediate between the initial temperature of the product and the desired heat treatment temperature and thereby creating vapors, withdrawing the cooled liquid product, conducting the vapors including all their inherent flavors from said expansion zone to a compressing zone for compressing said vapors to a pressure at least as high as that corresponding to the desired treating temperature, and in steady state operation injecting the vapors so compressed into said closed heat treating zone as the sole source of heat to produce the desired treatment of the material.

2. A method as claimed in claim 1, which comprises cooling the treated product by expansion in several successive expansion zones at decreasing pressures ranging between the pressure corresponding to the heat treating temperature and the pressure corresponding of the initial temperature of the product to be treated, and compressing again successively the vapors evolved in said expansion zones to pressures of increasing values between the pressure down to which the last expansion is performed and a pressure at least as high as that corresponding to the temperature of desired heat treatment.

3. A method as claimed in claim 1, which comprises cooling the treated product by expansion in a single expansion zone, and conducting successively the vapors evolved in said expansion zone through a plurality of compressing zones for compressing said vapors to pressures of increasing values between the pressure to which said expansion is performed and a pressure at least as high as that corresponding to the temperature of desired heat treatment.

4. A method as claimed in claim 1, which comprises before introducing the material to be heat treated to said treatment zone, causing the same to pass through said compressing device, and introducing said material mixed with the compressed vapors to said heat treating zone.

5. A method as claimed in claim 1, which comprises in the steady state of operation before introducing the material to be heat treated into said heat treatment zone, introducing the same into a preheating zone at a temperature intermediate between the initial temperature of the material and the desired treatment temperature.

6. A method as claimed in claim 1, which comprises causing the material to be heat treated to circulate in a preheating zone before introducing the same to said heat treatment zone, and withdrawing the treated product from said expansion zone and causing the same to circulate in said preheating zone in counter-current relationship with the material to be heat treated.

7. A continuous method for heat treating liquiform material which comprises introducing the liquiform material to be heat treated into a closed heat treating zone in a finely divided state, initially injecting steam into said heat treating zone to heat the material to a desired heat treating temperature and then cutting off said steam, cooling the heat treated product by expansion in several successive expansion zones at decreasing pressures ranging between the pressure corresponding to the desired heat treating temperature and the pressure corresponding to the initial temperature of the material to be heat treated, introducing the vapors including all inherent flavors evolved in at least one of said expansion zones within the mass of the material to be heat treated for preheating said material to a temperature intermediate between the initial temperature of the material and the desired heat treating temperature, compressing the vapors evolved in the other expansion zones to a pressure at least as high as that corresponding to the desired heat treating temperature, and in steady state operation injecting the vapors so compressed into said closed heat treating zones to produce the desired heat treatment of the material, and withdrawing the treated liquid heated product from the last expansion zone.

8. A continuous method for heat treating liquiform products, which comprises introducing the liquiform material to be heat treated into a closed heat treating zone in a finely divided state, initially injecting steam in said heat treating zone to heat the material to a desired heat treating temperature and then cutting off the initial steam, cooling the heat treated product by expansion in several successive expansion zones at decreasing pressures ranging between the pressure corresponding to the desired heat treating temperature and the pressure corresponding to the initial temperature of the material to be heat treated, in steady state operation introducing the vapors evolved in the last expansion zone including all inherent flavors within the mass of the material to be heat treated for preheating said material to a temperature intermediate between the initial temperature initially of the material and the desired heat treating temperature, introducing the so preheated material into an auxiliary heat exchanger pre-heating zone, introducing live steam into said auxiliary pre-heating zone out of contact with said material for further preheating the material to a temperature intermediate between the first preheating temperature and the desired heat treating temperature, compressing the vapors evolved including all their flavors evolved in the other expansion zones to a pressure at least as high as that corresponding to the desired heat treating temperature, injecting the vapors so compressed into said closed heat treating zone to produce the desired heat treatment of the material, and withdrawing the heated liquid product from the last expansion zone.

9. A continuous method for heat treating liquiform materials, which comprises introducing the liquiform material to be heat treated into a closed heat treating zone in a finely divided state, initially injecting steam into said heat treating zone to heat the material to a desired heat treating temperature and then cuting off said steam, cooling the so heat treated product by expansion in at least three successive expansion zones at decreasing pressures ranging between the pressure corresponding to the desired heat treating temperature and the pressure corresponding to the initial temperature of the material to be heat treated, in steady state operation introducing the vapors evolved in the last expansion zone including all inherent flavors within the mass of the material to be heat treated for preheating said material to a temperature intermediate between the initial temperature of the material and the desired heat treating temperature, introducing the so preheated material into an auxiliary preheating zone, introducing outside live steam into said preheating zone out of direct contact with said material for further preheating the material to a temperature intermediate between the first preheating temperature and the desired treatment temperature, introducing the vapors evolved in the first expansion zone within the mass of the material so preheated for still further preheating the material to a temperature intermediate between the second preheating temperature and the desired treatment temperature, compressing the vapors evolved in the other expansion zones to a pressure at least as high as that corresponding to the desired heat treatment temperature, injecting the vapors so compressed into said closed heat treatment zone to produce the desired heat treatment of the material, and withdrawing the treated liquid product from the last expansion zone.

10. A method as claimed in claim 1, said untreated liquiform material being divided into two portions of which a first said portion is so cooled and vaporized by expansion and so compressed and heated, and the second said portion is retained in said closed heat treating zone in finely divided state and is there heated by injection of said so compressed and heated first portion.

11. A method for the preservative treatment of a liquid, employing a treatment chamber and also employing a storage expansion chamber, consisting in atomizing said liquid in said treatment chamber, injecting said liquid in said atomized form into said treatment chamber, deriving treated liquids from said treatment chamber and atomizing the same, injecting the so atomized treated liquid from said treatment chamber into said storage expansion chamber, compressing vapors derived from said storage expansion chamber to re-use the same to the desired treatment temperature, and injecting the so heated compressed vapors into said treatment chamber into contact with the atomized liquid injected into said treatment chamber.

12. A process for the heat treatment of a liquid consisting in injecting this liquid in an atomized form into a heat treatment chamber, in contact with vapors coming out of a storage chamber in which the treated liquid is stored, said vapors being raised by compression up to the treatment temperature.

13. A process for the heat treatment of a liquid consisting in injecting this liquid in an atomized form into a heat treatment chamber, in contact with vapors coming out of a storage chamber in which the treated liquid is stored, said vapors being raised by compression up to the treatment temperature and during the initial starting period before steady state operation is attained, injecting into said treatment chamber foreign steam from an outside source.

14. A process for the preservative treatment of a liquid consisting in injecting this liquid in atomized form into a treatment chamber, conducting the so treated liquid into an expansion chamber, deriving vapors of said treated liquid from said expansion chamber after expansion therein, compressing the so derived vapors to raise them to the desired temperature of treatment in said treatment chamber, and injecting the so compressed derived vapors into said treatment chamber into contact with the liquids therein to be treated.

15. A process for the preservative treatment of a liquid consisting in injecting this liquid in atomized form into a treatment chamber, conducting the so treated liquid into an expansion chamber, deriving vapors of said treated liquid from said expansion chamber after expansion therein, compressing the so derived vapors to raise them to the desired temperature of treatment in said treatment chamber, and injecting the so compressed derived vapors into said treatment chamber into contact with the liquids therein to be treated, and during the initial starting period before steady state operation is attained, injecting into said treatment chamber foreign steam from an outside source to initially heat the liquid therein to a desired treatment temperature.

16. An apparatus for heat treating liquiform materials comprising means providing a closed heat treating chamber, means for introducing the liquiform material to be heat treated in a divided state into said heat treating chamber, means providing a closed expansion chamber, means providing a conduit for conducting the product from said heat treating chamber into said expansion chamber, means for finely dividing the product so discharged into said expansion chamber, means for withdrawing the liquid product from said means providing an expansion chamber, means providing a compressing device for vapors, means providing a conduit for conducting vapors from said expansion chamber to said compressing device, means for initially introducing priming steam into said compressing device and then cutting the same off when steady state operation is reached, and means for conducting the compressed vapors from said compressing device to said heat treating chamber and for introducing said vapors therein.

17. An apparatus as claimed in claim 16, comprising means providing a plurality of closed expansion chambers, means for conducting the product from said heat treating chamber successively to each of said expansion chambers, and means for finely dividing the product discharged into each of said expansion chambers, means providing a number of compressing devices for vapors corresponding to the number of said expansion chambers, means providing a plurality of conduits for conducting vapors from each of said expansion chambers respectively to each of said compressing devices, means for conducting the compressed vapors from the compressing device farthest from said heat treating chamber successively through the other compressing devices up to the compressing device nearest from said heat treating chamber, and means for conducting the compressed vapors from the last-mentioned compressing device to said heat treating chamber and for introducing said vapors therein.

18. An apparatus as claimed in claim 16, comprising means providing a plurality of compressing devices for vapors, means for conducting vapors from said expansion chamber successively through each of said compressing devices, and means for conducting the compressed vapors from the last compressing device to said heat treating chamber and for introducing said vapors therein.

19. An apparatus for heat treating liquiform products, comprising means providing for a compressing device for vapors, said compressing device having an outlet, means for introducing the liquiform product to be heat treated into said compressing device, means for initially introducing priming steam into said compressing device and then cutting the same off when steady state operation is reached, means connected to said outlet providing a closed heat treating chamber, means providing a closed expansion chamber, means providing a conduit for conducting the product from said heat treating chamber to said expansion chamber, means for finely dividing the product discharged into said expansion chamber, means for withdrawing the treated liquid product from said expansion chamber, and means providing a conduit for conducting vapors from said expansion chamber to said compressing device.

20. An apparatus for heat treating liquiform materials, comprising means providing a plurality of compressing devices for vapors, each of said compressing devices having an inlet and an outlet, means for initially introducing priming steam into the inlet of the first of said compressing devices and then cutting the same off when steady state operation is reached, means for interconnecting successively the outlet of each of said compressing device to the inlet of the subsequent compressing device, means for introducing the liquiform to be heat treated into the first compressing device, means connected to the outlet of the last compressing device providing a closed heat treating chamber, means providing a number of closed expansion chambers corresponding to the number of said compressing devices, means for conducting the product from said heat treating chamber successively to each of said expansion chambers and for finely dividing the product discharged into each of said expansion chambers, means for withdrawing the treated liquid product from the last expansion chamber, and means providing a plurality of conduits for conducting vapors from each of said expansion chambers respectively to each of said compressing devices for heating their respective contents.

21. An apparatus for heat treating liquiform materials, comprising means providing a plurality of compressing devices for vapors, each of said compressing devices having an inlet and an outlet, means for initially introducing priming steam into the inlet of the first of said compressing devices and then cutting the same off when steady state operation is reached, means for interconnecting successively the outlet of each of said compressing device to the inlet of the subsequent compressing device, means for introducing the liquiform to be heat treated into the first compressing device, means connected to the outlet of the last compressing device providing a closed heat treatment chamber, means providing a closed expansion chamber, means providing a conduit for conducting the product from said heat treating chamber to said expansion chamber, means for finely dividing the product discharged into said expansion chamber, means for withdrawing treated liquid product from said expansion chamber and means providing a conduit for conducting vapors from said expansion chamber to said first compressing device for heating the contents thereof.

22. An apparatus as claimed in claim 16, comprising means providing a preheating device for the liquiform material to be heat treated, means for introducing the material into said preheating device, means for introducing a heating fluid into said preheating device, means providing a conduit for conducting the preheated product from said preheating device to said heat treating chamber.

23. An apparatus as claimed in claim 16, comprising means providing a preheating device for the liquiform material to be heat treated, means for introducing said material into said preheating device and for circulating the same therein, means for conducting the treated product from said expansion chamber to said preheating device and for circulating the same therein in countercurrent relationship with a product to be heat treated.

References Cited in the file of this patent

UNITED STATES PATENTS

| | | |
|---|---|---|
| 1,693,034 | Jensen | Nov. 27, 1928 |
| 2,469,122 | Latham | May 3, 1949 |
| 2,636,430 | Brown et al. | Apr. 28, 1953 |
| 2,644,758 | Cross | July 7, 1953 |
| 2,732,308 | Laguilharre | Jan. 24, 1956 |